(12) United States Patent
Farhadiroushan et al.

(10) Patent No.: US 9,140,582 B2
(45) Date of Patent: Sep. 22, 2015

(54) OPTICAL SENSOR AND METHOD OF USE

(75) Inventors: Mahmoud Farhadiroushan, London (GB); Tom Richard Parker, London (GB); Sergey Shatalin, London (GB)

(73) Assignee: Silixa Limited, London (GB)

( * ) Notice: Subject to any disclaimer, the term of this patent is extended or adjusted under 35 U.S.C. 154(b) by 0 days.

(21) Appl. No.: 13/322,448

(22) PCT Filed: May 27, 2010

(86) PCT No.: PCT/GB2010/050888
§ 371 (c)(1),
(2), (4) Date: Mar. 12, 2012

(87) PCT Pub. No.: WO2010/136809
PCT Pub. Date: Dec. 2, 2010

(65) Prior Publication Data
US 2012/0162639 A1 Jun. 28, 2012

(30) Foreign Application Priority Data

May 27, 2009 (GB) .................................. 0908990.5
Jul. 11, 2009 (GB) .................................. 0912051.0

(51) Int. Cl.
*G01B 9/02* (2006.01)
*G01D 5/353* (2006.01)

(52) U.S. Cl.
CPC ........ *G01D 5/35303* (2013.01); *G01D 5/35383* (2013.01)

(58) Field of Classification Search
CPC ................................................. G01D 5/35303
USPC ........................................ 356/73.1, 477–495
See application file for complete search history.

(56) References Cited

U.S. PATENT DOCUMENTS 3,474,253 A 10/1969 Kessler
3,754,275 A 8/1973 Carter et al.
(Continued)

FOREIGN PATENT DOCUMENTS

CN 1412538 A 4/2003
CN 1841071 A 10/2006
(Continued)

OTHER PUBLICATIONS

Zhiqiang Zhao et al, "Improved Demodulation Scheme for Fiber Optic Interferometers Using an Asymmetric 33 Coupler", Journal of Lightwave Technology, IEEE Service Center, New York, NY, US, vol. 15, No. 11, Nov. 1, 1997.
(Continued)

*Primary Examiner* — Kara E Geisel
*Assistant Examiner* — Dominic J Bologna
(74) *Attorney, Agent, or Firm* — Osha Liang LLP

(57) ABSTRACT

An interferometer apparatus for an optical fiber system and method of use is described. The interferometer comprises an optical coupler and optical fibers which define first and second optical paths. Light propagating in the first and second optical paths is reflected back to the optical coupler to generate an interference signal. First, second and third interference signal components are directed towards respective first, second and third photodetectors. The third photodetector is connected to the coupler via a non-reciprocal optical device and is configured to measure the intensity of the third interference signal component directed back towards the input fiber. Methods of use in applications to monitoring acoustic perturbations and a calibration method are described.

29 Claims, 9 Drawing Sheets

(56) References Cited

U.S. PATENT DOCUMENTS

| | | |
|---|---|---|
| 4,138,659 A | 2/1979 | Johnson |
| 4,388,622 A | 6/1983 | Fletcher, Jr. |
| 4,428,236 A | 1/1984 | Votava et al. |
| 4,697,456 A | 10/1987 | Maser |
| 4,983,034 A | 1/1991 | Spillman, Jr. |
| 5,177,633 A | 1/1993 | Wong |
| 5,194,847 A | 3/1993 | Taylor et al. |
| 5,355,208 A | 10/1994 | Crawford et al. |
| 5,412,474 A | 5/1995 | Reasenberg et al. |
| 5,417,112 A | 5/1995 | Rosenberg |
| 5,596,410 A * | 1/1997 | Hantel et al. ............ 356/493 |
| 5,754,293 A * | 5/1998 | Farhadiroushan ......... 356/478 |
| 5,946,429 A * | 8/1999 | Huang et al. ............ 385/12 |
| 6,079,875 A | 6/2000 | Klass et al. |
| 6,097,486 A | 8/2000 | Vakoc et al. |
| 6,105,430 A | 8/2000 | Kepler et al. |
| 6,195,162 B1 | 2/2001 | Varnham et al. |
| 6,212,003 B1 * | 4/2001 | Komazawa et al. ....... 359/341.1 |
| 6,236,452 B1 * | 5/2001 | Goto et al. ............ 356/73.1 |
| 6,426,496 B1 | 7/2002 | Froggatt et al. |
| 6,449,046 B1 | 9/2002 | Huang et al. |
| 6,466,706 B1 | 10/2002 | Go et al. |
| 6,522,797 B1 | 2/2003 | Siems et al. |
| 6,555,807 B2 | 4/2003 | Clayton et al. |
| 6,591,025 B1 | 7/2003 | Siems et al. |
| 6,687,008 B1 * | 2/2004 | Peale et al. ............ 356/477 |
| 7,038,784 B2 | 5/2006 | Hall |
| 7,084,807 B2 | 8/2006 | Steinbuch et al. |
| 7,127,132 B1 * | 10/2006 | Moslehi et al. .......... 385/12 |
| 7,339,678 B2 | 3/2008 | Hall et al. |
| 7,355,163 B2 * | 4/2008 | Watley et al. ........... 250/227.14 |
| 7,488,929 B2 | 2/2009 | Townley-Smith et al. |
| 7,548,319 B2 | 6/2009 | Hartog |
| 7,946,341 B2 | 5/2011 | Hartog et al. |
| 2001/0030796 A1 | 10/2001 | Yao |
| 2002/0041722 A1 | 4/2002 | Johnson et al. |
| 2002/0064330 A1 | 5/2002 | Croteau et al. |
| 2003/0038231 A1 | 2/2003 | Bryant et al. |
| 2003/0095262 A1 * | 5/2003 | Blake ................... 356/477 |
| 2004/0065444 A1 | 4/2004 | Smith et al. |
| 2004/0239555 A1 | 12/2004 | Steinbuch et al. |
| 2005/0008322 A1 | 1/2005 | Sullivan et al. |
| 2005/0077455 A1 * | 4/2005 | Townley-Smith et al. ............ 250/227.27 |
| 2005/0180263 A1 | 8/2005 | Lambert et al. |
| 2006/0018586 A1 | 1/2006 | Kishida |
| 2006/0101915 A1 | 5/2006 | Thompson et al. |
| 2006/0146337 A1 | 7/2006 | Hartog |
| 2006/0212231 A1 | 9/2006 | Bailey |
| 2006/0225507 A1 | 10/2006 | Paulson |
| 2006/0262889 A1 | 11/2006 | Kalvaitis et al. |
| 2007/0009007 A1 | 1/2007 | Nicholls et al. |
| 2007/0041020 A1 | 2/2007 | Hall |
| 2007/0145251 A1 | 6/2007 | Ogura et al. |
| 2008/0025146 A1 | 1/2008 | Welker |
| 2008/0144016 A1 | 6/2008 | Lewis et al. |
| 2008/0170742 A1 | 7/2008 | Trusov et al. |
| 2008/0277568 A1 | 11/2008 | Crickmore et al. |
| 2009/0114386 A1 | 5/2009 | Hartog et al. |
| 2009/0129785 A1 | 5/2009 | Murakami |
| 2009/0323734 A1 | 12/2009 | Drodofsky et al. |

FOREIGN PATENT DOCUMENTS

| | | |
|---|---|---|
| CN | 101297336 A | 10/2008 |
| DE | 3828943 A1 | 3/1990 |
| DE | 9318404 U1 | 2/1994 |
| DE | 19506180 C1 | 6/1996 |
| DE | 10338952 A1 | 3/2005 |
| EP | 1286133 | 2/2003 |
| EP | 1286133 A2 | 2/2003 |
| EP | 0944813 | 10/2004 |
| EP | 1488482 A2 | 12/2004 |
| EP | 1615011 A1 | 1/2006 |
| EP | 1734223 A2 | 12/2006 |
| EP | 1853964 A1 | 11/2007 |
| EP | 1968165 A2 | 9/2008 |
| EP | 2029993 A2 | 3/2009 |
| EP | 2098842 A1 | 9/2009 |
| EP | 2362190 A1 | 8/2011 |
| EP | 2364226 A1 | 9/2011 |
| GB | 2145514 A | 3/1985 |
| GB | 2191909 A | 12/1987 |
| GB | 2197953 A | 6/1988 |
| GB | 2329960 A | 4/1999 |
| GB | 2354782 A | 4/2001 |
| GB | 2367890 | 4/2002 |
| GB | 2396011 A | 6/2004 |
| GB | 2401738 A | 11/2004 |
| GB | 2408327 A | 5/2005 |
| GB | 2414543 A | 11/2005 |
| GB | 2442745 A | 4/2008 |
| GB | 2443661 A | 5/2008 |
| GB | 2445364 A | 7/2008 |
| GB | 2456300 A | 7/2009 |
| GB | 2462096 A | 1/2010 |
| GB | 2467177 A | 7/2010 |
| GB | 2469709 A | 10/2010 |
| JP | S5948664 A | 3/1984 |
| JP | H11237287 A | 8/1999 |
| JP | 2005-345137 A | 12/2005 |
| JP | 2007240287 A | 9/2007 |
| JP | 2009031040 A | 2/2009 |
| WO | 98/27406 A1 | 6/1998 |
| WO | 0246737 A2 | 6/2002 |
| WO | 2003077381 A3 | 9/2003 |
| WO | 2004/029671 | 4/2004 |
| WO | 2004029671 A2 | 4/2004 |
| WO | 2004/070346 | 8/2004 |
| WO | 2004070346 A2 | 8/2004 |
| WO | 2004/102840 A1 | 11/2004 |
| WO | 2004102242 A1 | 11/2004 |
| WO | 2006048647 A2 | 5/2006 |
| WO | 2006092606 A1 | 9/2006 |
| WO | 2006/130499 A2 | 12/2006 |
| WO | 2007/021287 | 2/2007 |
| WO | 2007021287 A1 | 2/2007 |
| WO | 2007/049004 | 5/2007 |
| WO | 2007049004 A1 | 5/2007 |
| WO | 2007/109127 | 9/2007 |
| WO | 2007131794 A2 | 11/2007 |
| WO | 2008/056143 A1 | 5/2008 |
| WO | 2008060719 A2 | 5/2008 |
| WO | 2009/056855 | 5/2009 |
| WO | 2010009007 A1 | 1/2010 |
| WO | 2010020781 A1 | 2/2010 |
| WO | 2010065478 A1 | 6/2010 |
| WO | 2010091404 A1 | 8/2010 |
| WO | 2010116119 A2 | 10/2010 |
| WO | 2011058322 A2 | 5/2011 |

OTHER PUBLICATIONS

International Search Report for International App. No. PCT/GB2010/050888.

International Search Report for International App. No. PCT/GB2010/050889.

Examination Report issued in corresponding Great Britain Application No. 1120615.8 dated Feb. 11, 2014 (2 pages).

Examination Report issued in corresponding Australian Application No. 2010252746 dated Jul. 4, 2014 (3 pages).

Office Action issued in corresponding Chinese Application No. 201080032395.3 dated Mar. 17, 2014 (10 pages).

Shatalin, Sergey et al., "Interferometric optical time-domain reflectometry for distributed optical-fiber sensing", Applied Optics, vol. 37, No. 24, pp. 5600-5604, Aug. 20, 1998 (5 pages).

Combined Search and Examination Report issued in British Application No. GB1419009.4; Dated Nov. 28, 2014 (5 pages).

Combined Search and Examination Report issued in British Application No. GB1414505.6; Dated Sep. 29, 2014 (5 pages).

Search Report issued in British Application No. GB1419110.0; Dated Dec. 11, 2014 (1 page).

(56) References Cited

OTHER PUBLICATIONS

Search Report issued in British Application No. GB1419594.5; Dated Dec. 12, 2014 (1 page).
Search Report issued in British Application No. GB1421508.1; Dated Dec. 19, 2014 (1 page).
Combined Search and Examination Report issued in British Application No. GB1421510.7; Dated Jan. 20, 2015 (7 pages).
Combined Search and Examination Report issued in British Application No. GB1421509.9; Dated Jan. 26, 2015 (8 pages).
Combined Search and Examination Report issued in British Application No. GB1421507.3; Dated Jan. 27, 2015 (6 pages).
Combined Search and Examination Report issued in British Application No. GB1422080.0; Dated Jan. 29, 2015 (7 pages).
Examination Report issued in British Application No. GB1419116.7; Dated May 5, 2015 (5 pages).
Examination Report issued in British Application No. GB1419116.7; Dated May 21, 2015 (2 pages).
Examination Report issued in British Application No. GB1419594.5; Dated May 22, 2015 (4 pages).
Combined Search and Examination Report issued in British Application No. GB1502005.0; Dated Feb. 16, 2015 (7 pages).
Combined Search and Examination Report issued in British Application No. GB1412510.8; Dated Aug. 7, 2014 (7 pages).
Combined Search and Examination Report issued in British Application No. GB1415258.1; Dated Oct. 20, 2014 (7 pages).
Combined Search and Examination Report issued in British Application No. GB1416571.6; Dated Oct. 22, 2014 (6 pages).
Combined Search and Examination Report issued in British Application No. GB1419107.6; Dated Nov. 28, 2014 (8 pages).
Combined Search and Examination Report issued in British Application No. GB1419112.6; Dated Nov. 28, 2014 (7 pages).
Combined Search and Examination Report issued in British Application No. GB1419116.7; Dated Dec. 2, 2014 (6 pages).
Combined Search and Examination Report issued in British Application No. GB1419120.9; Dated Nov. 28, 2014 (9 pages).
Examination Report issued in Australian Application No. 2010252747 dated Jun. 11, 2014 (3 pages).
Examination Report issued in Great Britain Application No. GB1120619.0 dated Mar. 14, 2014 (3 pages).
Office Action issued in Chinese Application No. 201080033359.9 with English translation dated Apr. 16, 2014 (14 pages).
Search and Examination Report issued in British Application No. GB1412510.8; Dated Sep. 11, 2014 (3 pages).
Search and Examination Report issued in British Application No. GB1412510.8; Dated Sep. 11, 2014 (4 pages).
Search and Examination Report issued in British Application No. GB1412510.8; Dated Sep. 11, 2014 (5 pages).
Search and Examination Report issued in British Application No. GB1412510.8; Dated Sep. 11, 2014 (6 pages).
Search and Examination Report issued in British Application No. GB1412510.8; Dated Sep. 15, 2014 (4 pages).
Kersey, et al, "Polarisation-insensitive fibre optic Michelson interferometer", Electronics Letters, IEEE Stevenage, GB, vol. 27, No. 6, Mar. 14, 1991, pp. 518-520.
Sun, et al, "General Analysis of 3X3 Optical-Fiber Directional Couplers", Microwave and Optical Technology Letters USA, vol. 2, No. 2, Feb. 1989, pp. 52-54.
Brown, et al., "A symmetric 3x3 coupler based demodulator for fiber optic interferometric sensors", Proceedings of the SPIE—The International Society for Optical Engineering USA, vol. 1584, Dec. 1991, pp. 328-335.
International Search Report for International App. No. PCT/GB2010/050889; Dated Aug. 30, 2011 (5 pages).
International Search Report for International App. No. PCT/GB2010/050888; Dated Sep. 13, 2011 (5 pages).
Office Action issued in U.S. Appl. No. 13/322,449; Dated Dec. 23, 2013 (24 pages).
Office Action issued in U.S. Appl. No. 13/322,449; Dated Jul. 3, 2014 (12 pages).
Office Action issued in U.S. Appl. No. 13/322,449; Dated Sep. 25, 2014 (18 pages).
Office Action issued in U.S. Appl. No. 13/322,449; Dated May 4, 2015 (10 pages).
Examination Report issued in British Application No. GB1419110.0; Dated Jun. 25, 2015 (4 pages).
Examination Report issued in British Application No. GB1419112.6; Dated Jun. 25, 2015 (3 pages).
Examination Report issued in British Application No. GB1421510.7; Dated Jun. 30, 2015 (4 pages).
Examination Report issued in British Application No. GB1422080.0; Dated Jun. 30, 2015 (9 pages).

\* cited by examiner

OPTICAL SENSOR AND METHOD OF USE

FIELD OF THE INVENTION

The present invention relates to optical sensors and, in particular, to an interferometer and methods of use.

BACKGROUND TO THE INVENTION

The benefits of optical fibres have been demonstrated in a number of sensing applications. The two major areas are: (i) distributed optical fibre sensors, and (ii) multiplexed point sensor arrays.

Distributed sensors utilise the intensity of backscatter light, with Raman and/or Brillouin peaks in the light signal utilised to measure temperature, strain or pressure. Distributed sensors offer a number of advantages including continuous sensing along the entire length of fibre, and flexibility and simplicity of the sensor, which may be standard telecoms optical fibre. For example, a distributed sensor may provide 10,000 measurement points along 10 km of optical fibre with a 1 m spatial resolution. Distributed sensor systems therefore offer low installation and ownership costs.

However, due to their slow response, distributed sensors are usually only used in applications where measurements taking in order of several seconds to hours are acceptable. The most common sensors of this type are the distributed temperature sensors (DTS), which are made by a number of companies. A typical performance of a DTS is 1 m spatial resolution and 1° C. temperature resolution in 60 seconds over a 10 km range.

Distributed sensors have also been used to measure strain by utilising Brillouin shifts in reflected or backscattered light, as described in U.S. Pat. No. 6,555,807 [1] or WO 98/27406 [2]. The frequency of the Brillouin shift is about 1 MHz/10µε and its linewidth is about 30 MHz. The strain in an order of 10µε can be determined along an optical fibre using the narrow frequency scanning methods described. However, using these approaches, the scanning rate is much slower than the pulse repetition rate and measurement times are typically in the order of few seconds to few minutes.

More recently, a technique for faster measurement of Brillouin frequency shift has been proposed in U.S. Pat. No. 7,355,163 [3]. This technique uses a frequency to amplitude convertor which may be in a form of an optical fibre Mach-Zehnder interferometer with a 3×3 coupler at its output. However, the strain resolution is limited by the linewidth of the Brillouin light and therefore the optical path length difference in the interferometer should be kept within the coherence length of the Brillouin light. Also, the polarisation fading between the two paths of the interferometer, the offset and gain variations of the photodetector receivers would significantly limit the strain measurement. Measurement times of around 0.1 seconds (10 Hz) with strain resolution of 50µε have been recently reported using this technique.

For many applications, such as acoustic sensing, much higher sensitivities and faster a measurement time in the order of 1 millisecond (1 kHz), 0.1 millisecond (10 kHz) or 0.01 millisecond (100 kHz) is required.

Multiplexed point sensors offer fast measurements with high sensitivity and are used, for example, in hydrophone arrays. The main application for these in the energy market is for towed and seafloor seismic arrays. However, unlike with distributed sensors, multiplexed point sensors cannot be used where full coverage is required. The size and the position of the sensing elements are fixed and the number of sensors multiplexed on a single fibre is typically limited to 50 to 100 elements. Furthermore, the sensor design relies on additional optical fibre components leading to bulky and expensive array architectures. There is also considerable effort to increase the number of sensors that can be efficiently multiplexed on a single length of fibre.

Optical-time-domain reflectometry (OTDR) is a well known technique that has been used to test optical fibre communications cables. In order to reduce the effect of coherent backscatter interference, which is sometime is referred to as Coherent Rayleigh Noise, a broadband light source is normally used. However, proposals have also been made in U.S. Pat. No. 5,194,847 [4] to use coherent OTDR for sensing intrusion by detecting the fast changes in a coherent backscatter Rayleigh signal. In addition, Shatalin et al. [5] describes using coherent Rayleigh as a distributed optical fibre alarm sensor.

WO 2008/056143 [6] describes a disturbance sensor similar to that of U.S. Pat. No. 5,194,847 [4] using a semiconductor distributed feedback laser source. A fibre Bragg grating filter of preferably 7.5 GHz is used to reject out-of-band chirped light and, thereby, improve the coherence of the laser pulse sent into the fibre. However, this requires matching of the laser wavelength with the narrow band optical filter, which results in the signal visibility variation being reduced compared to a system which uses a very high coherent source as proposed by U.S. Pat. No. 5,194,847.

Similar techniques have also been proposed for the detection of buried optical fibre telecommunication cables (for example in WO 2004/102840 [7]), in perimeter security (GB 2445364 [8] and US2009/0114386 [9]) and downhole vibration monitoring (WO 2009/056855 [10]). However, the response of these coherent Rayleigh backscatter systems has been limited by a number of parameters such as polarisation and signal fading phenomena; the random variation of the backscatter light; and non-linear coherent Rayleigh response. Therefore these techniques are mainly used for event detection and do not provide quantitative measurements, such as the measurement of acoustic amplitude, frequency and phase over a wide range of frequency and dynamic range.

SUMMARY OF THE INVENTION

The present invention provides novel apparatus and methods for fast quantitative measurement of perturbation of optical fields transmitted, reflected and or scattered along a length of an optical fibre.

The present invention can be used for distributed sensors, point sensors, or the combination of both.

In particular this technique can be applied to distributed sensors while extending dramatically the speed and sensitivity to allow the detection of acoustic perturbations anywhere along a length of an optical fibre while achieving fine spatial resolution. The present invention offers unique advantages in a broad range of acoustic sensing and imaging applications. Typical uses are for monitoring oil and gas wells, for applications such as for distributed flow metering and/or imaging; seismic imaging, monitoring long cables and pipelines; acoustic imaging inside large vessels as well as security applications.

It is an object of the present invention to provide apparatus for highly sensitive and fast quantitative measurement of the phase, frequency and amplitude of the light transmitted, reflected or scattered along a length of an optical fibre.

In the prior art, optical couplers have been used in Michelson or Mach-Zehnder interferometer configurations where the polarisation between the two arms of the interferometer has to be carefully controlled. The novel interferometer in the present invention allows an m×m coupler to be utilised using non-reciprocal devices, such as Faraday rotator mirrors and an optical circulator, to provide compensated light interference with a given phase shift that can be measured at all ports of the optical coupler and analysed very quickly, such as at several tens of kilohertz.

The embodiments of the invention can be used for multiplexed acoustic point sensors, distributed sensors or a combination of both. In the case of distributed sensors, light pulses are injected into the fibre and the phase modulation of the backscattered light is measured along the fibre at several tens of kilohertz. The fibre can be standard telecommunication fibre and/or cable. Using the techniques described herein, the sensing system can thereby detect the acoustic field along the fibre to provide a distributed acoustic sensor whereby the lengths of the sensing elements can be selected by a combination of adjusting the modulation of the light pulse, the path length in the interferometer as well as the sensing fibre configuration.

The data collected along the fibre are automatically synchronised and they may be combined to provide coherent field images.

According to a first aspect of the invention, there is provided interferometer apparatus for an optical fibre system, the apparatus comprising:
an optical coupler having an input port and first and second ports coupled to optical fibres which define first and second optical paths;
first and second reflectors arranged respectively in the first and second optical paths to reflect light propagating in the first and second optical paths back to the optical coupler to generate an interference signal;
wherein the optical coupler is configured to direct first and second interference signal components respectively to first and second detector ports, and is configured to direct a third interference signal component towards the input port, and the apparatus comprises means for introducing a phase shift between the first, second and third interference signal components;
first and second photodetectors connected to first and second detector ports of the optical coupler and configured to measure an intensity of first and second interference signal components at respective phase shifts;
and wherein the apparatus comprises a third photodetector connected to the non-reciprocal optical device and configured to measure the intensity of the third interference signal component directed back towards the input fibre.

The means for introducing a phase shift between the first, second and third interference signal components may be the optical coupler, preferably an m×m optical coupler, where m≥3. The non-reciprocal optical device may be an optical circulator.

The optical fibres and reflectors may be configured to maintain polarisation or provide polarisation compensation for light propagating in the first and second optical paths. The reflectors may be Faraday Rotator Mirrors (FRMs), permitting the use of standard (non-polarisation maintaining) fibres.

The non-reciprocal optical device may be configured to receive the light signal and transmit it to the input port of the optical coupler.

This arrangement provides an economical configuration of components, which allow all ports of the optical coupler to be used effectively. The arrangement provides a "spare" port which may be used to cascade multiple interferometers together, or to couple to an additional detector or interferometer arm.

Other preferred and optional features of this aspect of the invention are defined by the claims. Furthermore, embodiments of this aspect of the invention may comprise preferred and optional features of other aspects of the invention.

According to a second aspect of the invention there is provided an interferometer system comprising a first interferometer apparatus as claimed in any preceding claim, and a second interferometer apparatus as claimed in any preceding claim, wherein a third output port of the optical coupler of the first interferometer apparatus is coupled to an input of the second interferometer apparatus.

The interferometer system may comprise multiple interferometer apparatuses, wherein respective output ports of a subset of the interferometer apparatuses are utilised as inputs for sequential interferometer apparatuses.

The different interferometer apparatuses may have different optical path length differences. This facilitates selection of different spatial resolutions in applications of the interferometer system.

Other preferred and optional features of this aspect of the invention are defined by the claims. Furthermore, embodiments of this aspect of the invention may comprise preferred and optional features of other aspects of the invention.

According to a third aspect of the invention there is provided an optical fibre system for monitoring an optical signal, the system comprising:
a light source;
an optical fibre deployed in an environment to be monitored and coupled to the light source;
an interferometer apparatus as claimed in any of claims 1 to 14 and configured to receive backscattered or reflected light from the optical fibre;
data capturing means for gathering data output from the photodetectors of the interferometer apparatus.

Other preferred and optional features of this aspect of the invention are defined by the claims. Furthermore, embodiments of this aspect of the invention may comprise preferred and optional features of other aspects of the invention.

According to a fourth aspect of the invention there is provided a method of monitoring acoustic perturbations, the method comprising:
providing a light source, an optical fibre deployed in the environment to be monitored and coupled to the light source, and an interferometer configured to receive a pulsed optical signal from the optical fibre, the interferometer comprising at least two optical paths and at least two photodetectors;
receiving backscattered or reflected light from the optical fibre in the interferometer, and generating an interference signal;
introducing a phase shift between first and second interference signal components of the interference signal, and directing the first and second interference signal components to first and second photodetectors respectively;
measuring the intensity of the first and second interference signal components at respective phase shifts to provide first intensity data and second intensity data;
processing the first and second intensity data to determine the optical phase angle of the optical signal and provide optical phase angle data;
processing the optical phase data to determine optical phase angle modulation data, and;
identifying acoustic perturbations to which the optical fibre has been exposed from the optical phase angle modulation data.

The step of identifying acoustic perturbations to which the optical fibre has been exposed preferably comprises characterising the acoustic perturbations.

The method may comprise generating an acoustic output signal from the characterised acoustic perturbations.

Other preferred and optional features of this aspect of the invention are defined by the claims. Furthermore, embodiments of this aspect of the invention may comprise preferred and optional features of other aspects of the invention.

According to a fifth aspect of the invention there is provided method of operating an interferometer in an optical system, the method comprising:

providing an interferometer comprising an input configured to receive transmitted, reflected, or backscattered light from a first light source, at least first and second optical paths, and a plurality of photodetectors;

providing an incoherent light source configured to input incoherent light to the interferometer;

determining a normalisation factor for a photodetector offset, a relative photodetector gain, and/or a coupling ratio of the interferometer optical paths, by inputting light from an incoherent light source to the interferometer and measuring the outputs of the photodetectors.

Other preferred and optional features of this aspect of the invention are defined by the claims. Furthermore, embodiments of this aspect of the invention may comprise preferred and optional features of other aspects of the invention.

BRIEF DESCRIPTION OF THE DRAWINGS

Embodiments of the invention and how to put it into practice are described by way of example with reference to the accompanying drawings in which:—

DETAILED DESCRIPTION OF PREFERRED EMBODIMENTS

Figure 1:
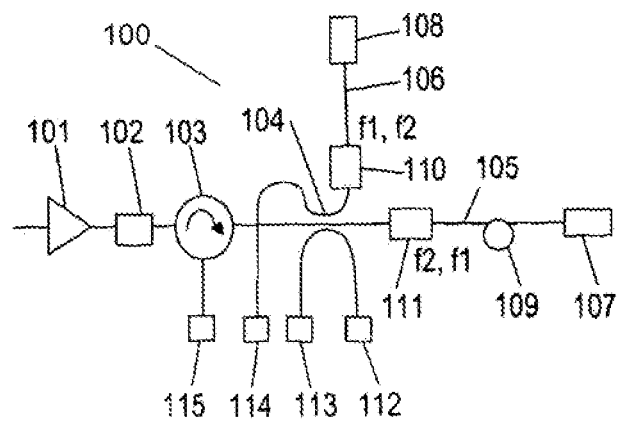
FIGS. 1, 2, 3 and 4 show schematically novel interferometer apparatus according to related embodiments of the invention, comprising circulators and multiple fibre couplers with different optical paths through the interferometers, Faraday-rotator mirrors and photodetectors.

FIG. 1 shows a first embodiment, generally depicted at 100, of a novel interferometer for measuring the optical amplitude, phase and frequency of an optical signal. The incoming light from a light source (not shown) is preferably amplified in an optical amplifier 101, and transmitted to the optical filter 102. The filter 102 filters the out of band Amplified Spontaneous Emission noise (ASE) of the amplifier 101.

The light then enters into an optical circulator 103 which is connected to a 3×3 optical coupler 104. A portion of the light is directed to the photodetector 112 to monitor the light intensity of the input light. The other portions of light are directed along first and second optical paths 105 and 106, with a path length difference between the two paths. Faraday-rotator mirrors (FRMs) 107 and 108 reflect the light back through the first and second paths 105 and 106, respectively. The Faraday rotator mirrors provide self-polarisation compensation along optical paths 105 and 106 such that the two portions of light efficiently interfere at each of the 3×3 coupler 104 ports. The optical coupler 104 introduces relative phase shifts of 0 degrees, +120 degrees and −120 degrees to the interference signal, such that first, second and third interference signal components are produced, each at a different relative phase.

First and second interference signal components are directed by the optical coupler 104 to photodetectors 113 and 114, which measure the intensity of the respective interference signal components.

The circulator 103 provides an efficient path for the input light and the returning (third) interference signal component through the same port of the coupler 104. The interference signal component incident on the optical circulator 103 is directed towards photodetector 115 to measure the intensity of the interference signal component.

The outputs of the photodetectors 113, 114 and 115 are combined to measure the relative phase of the incoming light, as described in more detail below with reference to FIGS. 7 and 9.

Optionally, frequency shifters 110 and 111 and/or optical modulator 109 may be used along the paths 105 and 106 for heterodyne signal processing. In addition, the frequency shift of 110 and 111 may be alternated from f1, f2 to f2, f1 respectively to reduce any frequency-dependent effect between the two portions of the light propagating through optical paths 105 and 106.

The above-described embodiment provides a novel apparatus suitable for fast quantitative measurement of perturbation of optical fields, and in particular can be used for distributed and multiplexed sensors with high sensitivity and fast response times to meet requirements of applications such as acoustic sensing.

Figure 7:
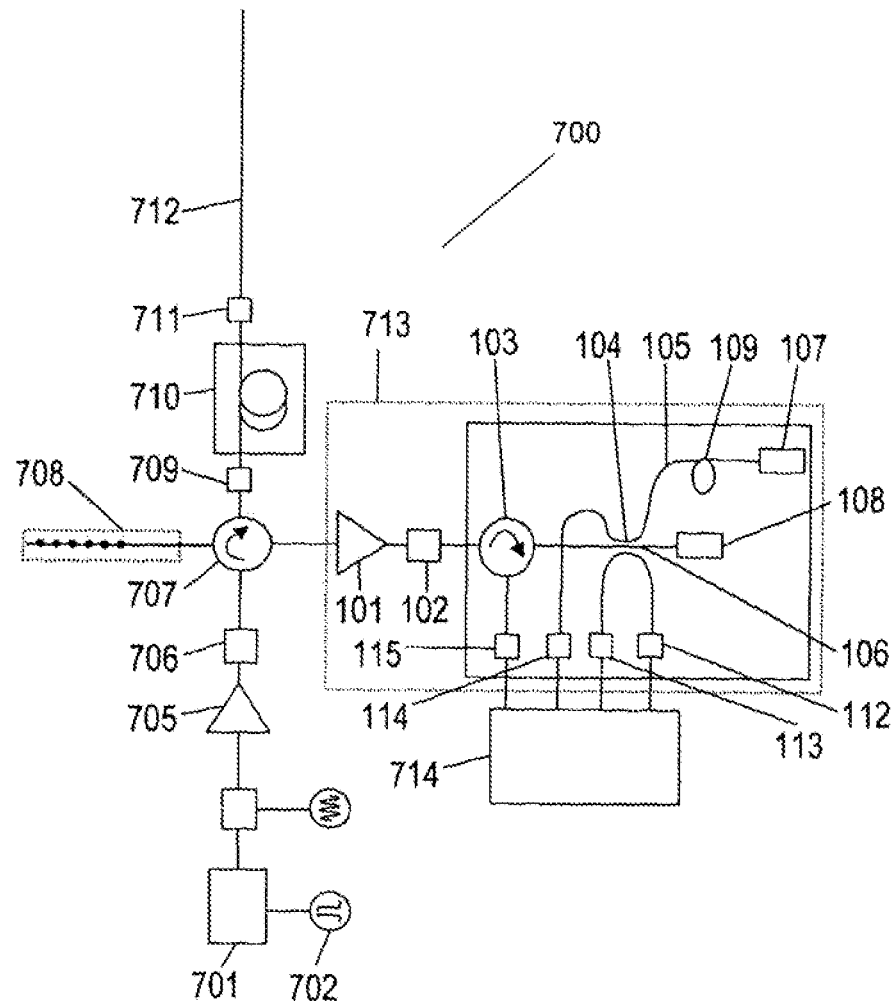
FIG. 7 shows schematically a sensor system that utilises the interferometer of an embodiment of the invention for fast measurement of scattered and reflected light from an optical fibre.

FIG. 7 shows an application of the interferometer of FIG. 1 to the distributed sensing of an optical signal from an optical system 700. It will be apparent that although the application is described in the context of distributed sensing, it could also be used for point sensing, for example by receiving reflected light from one or more point sensors coupled to the optical fibre.

In this embodiment 700, light emitted by a laser 701 is modulated by a pulse signal 702. An optical amplifier 705 is used to boost the pulsed laser light, and this is followed by a band-pass filter 706 to filter out the ASE noise of the amplifier. The optical signal is then sent to an optical circulator 707. An additional optical filter 708 may be used at one port of the circulator 707. The light is sent to sensing fibre 712, which is for example a single mode fibre or a multimode fibre deployed in an environment in which acoustic perturbations are desired to be monitored. A length of the fibre may be isolated and used as a reference section 710, for example in a "quiet" location or with a controlled reference signal. The reference section 710 may be formed between reflectors or a combination of beam splitters and reflectors 709 and 711.

The reflected and the backscattered light generated along the sensing fibre 712 is directed through the circulator 707 and into the interferometer 713. The detailed operation of the interferometer 713 is described earlier with reference to FIG.

1. In this case, the light is converted to electrical signals using fast low-noise photodetectors 112, 113, 114 and 115. The electrical signals are digitised and then the relative optical phase modulation along the reference fibre 710 and the sensing fibre 712 is computed using a fast processor unit 714 (as will be described below). The processor unit is time synchronised with the pulse signal 702. The path length difference between path 105 and path 106 defines the spatial resolution. The photodetector outputs may be digitised for multiple samples over a given spatial resolution. The multiple samples are combined to improve the signal visibility and sensitivity by a weighted averaging algorithm combining the photodetector outputs.

Data Processing

Figure 9:
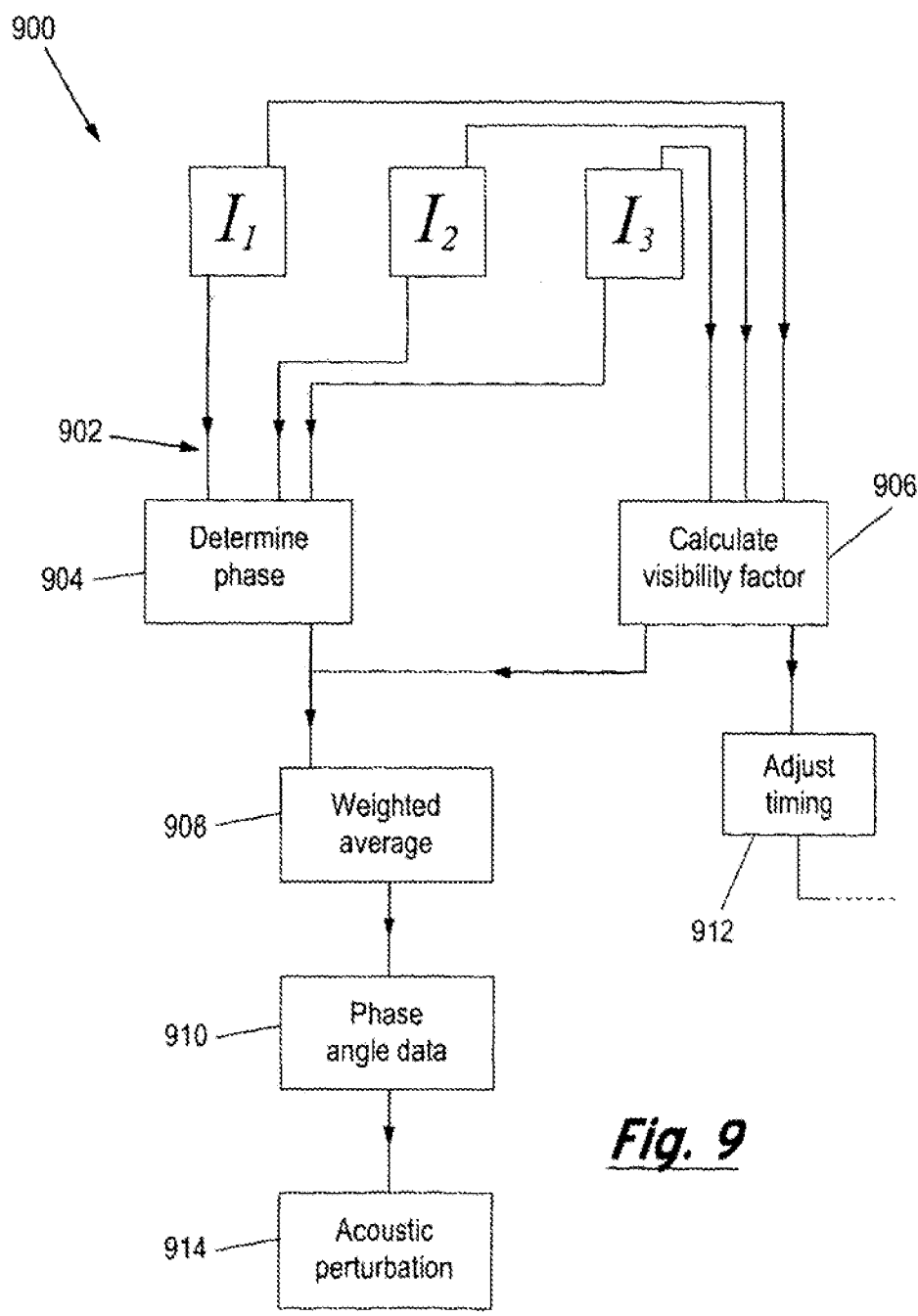
FIG. 9 is a block diagram representing a data processing method according to an embodiment of the invention.

FIG. 9 schematically represents a method 900 by which the optical phase angle is determined from the outputs of the photodetectors 113, 114, 115. The path length difference between path 105 and path 106 defines the spatial resolution of the system. The photodetector outputs may be digitised for multiple samples over a given spatial resolution, i.e. the intensity values are oversampled. The multiple samples are combined to improve the signal visibility and sensitivity by a weighted averaging algorithm combining the photo-detector outputs.

The three intensity measurements $I_1$, $I_2$, $I_3$, from the photodetectors 113, 114, 115 are combined at step 902 to calculate the relative phase and amplitude of the reflected or back-scattered light from the sensing fibre. The relative phase is calculated (step 904) at each sampling point, and the method employs oversampling such that more data points are available than are needed for the required spatial resolution of the system. Methods for calculating the relative phase and amplitude from three phase shifted components of an interference signal are known from the literature. For example, Zhiqiang Zhao et al. [12] and U.S. Pat. No. 5,946,429 [13] describe techniques for demodulating the outputs of 3×3 couplers in continuous wave multiplexing applications. The described techniques can be applied to the time series data of the present embodiment.

For each sampling point, a visibility factor V is calculated at step 906 from the three intensity measurements $I_1$, $I_2$, $I_3$, from the photodetectors 113, 114, 115, according to equation (1), for each pulse.

$$V=(I_1-I_2)^2+(I_2-I_3)^2+(I_3-I_1)^2 \quad \text{Equation (1)}$$

At a point of low visibility, the intensity values at respective phase shifts are similar, and therefore the value of V is low. Characterising the sampling point according the V allows a weighted average of the phase angle to be determined (step 908), weighted towards the sampling points with better visibility. This methodology improves the quality of the phase angle data 910.

Optionally, the visibility factor V may also be used to adjust (step 912) the timing of the digital sampling of the light for the maximum signal sensitivity positions. Such embodiments include a digitiser with dynamically varying clock cycles, (which may be referred to herein as "iclock"). The dynamically varying clock may be used to adjust the timing of the digitised samples at the photodetector outputs for the position of maximum signal sensitivity and or shifted away from positions with poorer visibility.

The phase angle data is sensitive to acoustic perturbations experienced by the sensing fibre. As the acoustic wave passes through the optical fibre, it causes the glass structure to contract and expand. This varies the optical path length between the backscattered light reflected from two locations in the fibre (i.e. the light propagating down the two paths in the interferometer), which is measured in the interferometer as a relative phase change. In this way, the optical phase angle data can be processed at 914 to measure the acoustic signal at the point at which the light is generated.

In preferred embodiments of the invention, the data processing method 900 is performed utilising a dedicated processor such as a Field Programmable Gate Array.

Sensor Calibration

Figure 10:
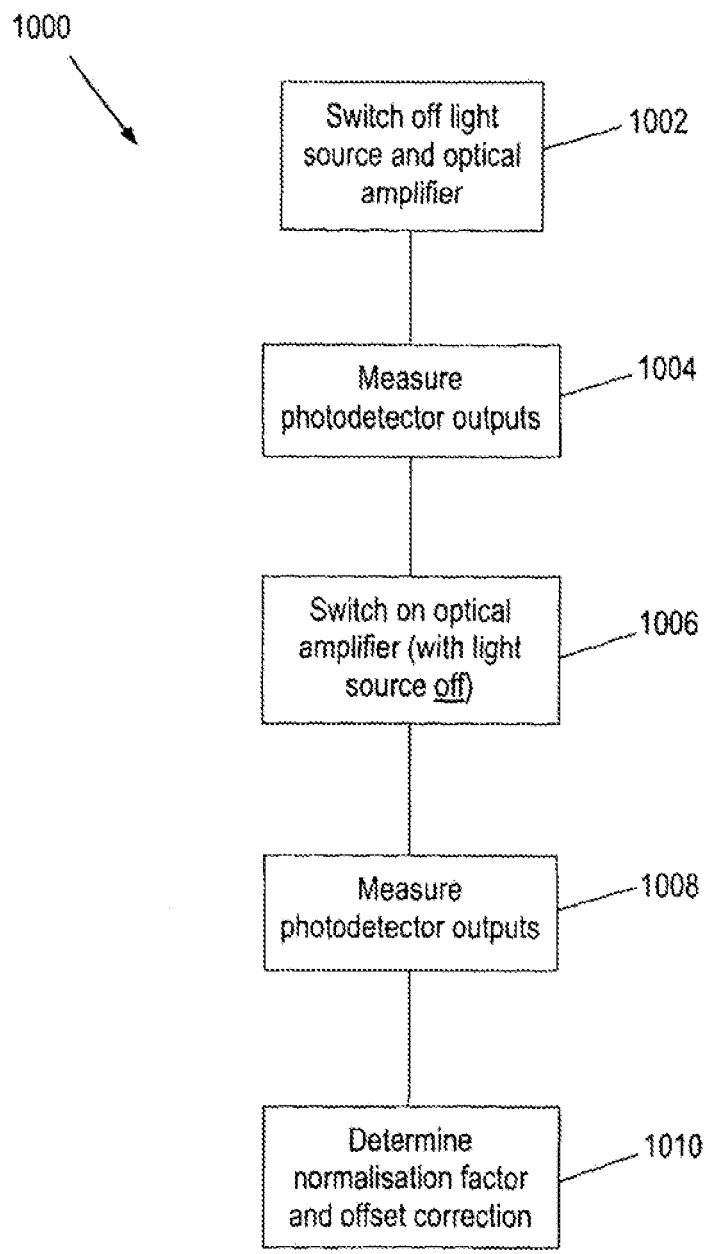
FIG. 10 is a block diagram representing a method of calibrating the interferometer according to an embodiment of the invention.

For accurate phase measurement, it is important to measure the offset signals and the relative gains of the photo-detectors 113,114 and 115. These can be measured and corrected for by method 1000, described with reference to FIG. 10.

Each photodetector has electrical offset of the photodetectors, i.e. the voltage output of the photodetector when no light is incident on the photodetector (which may be referred to as a "zero-light level" offset. As a first step (at 1002) switching off the incoming light from the optical fibre and the optical amplifier 101. When switched off, the optical amplifier 101 acts as an efficient attenuator, allowing no significant light to reach the photodetectors. The outputs of the photodetectors are measured (step 1004) in this condition to determine the electrical offset, which forms a base level for the calibration.

The relative gains of the photodetectors can be measured, at step 1008, after switching on the optical amplifier 101 while the input light is switched off (step 1006). The in-band spontaneous emission (i.e. the Amplified Spontaneous Emission which falls within the band of the bandpass filter 102), which behaves as an incoherent light source, can then be used to determine normalisation and offset corrections (step 1010) to calibrate the combination of the coupling efficiency between the interferometer arms and the trans-impedance gains of the photodetectors 113, 114 and 115. This signal can also be used to measure the signal offset, which is caused by the in-band spontaneous emission.

Conveniently, the optical amplifier, which is a component of the interferometer, is used as an incoherent light source without a requirement for an auxiliary source. The incoherence of the source is necessary to avoid interference effects at the photodetectors, i.e. the coherence length of the light should be shorter than the optical path length of the interferometer. However, for accurate calibration it is preferable for the frequency band of the source to be close to, or centred around, the frequency of light from the light source. The bandpass filter 102 is therefore selected to filter out light with frequencies outside of the desired bandwidth from the Amplified Spontaneous Emission.

When used in a pulsed system, such as may be used in a distributed sensor, the above-described method can be used between optical pulses from the light source, to effectively calibrate the system during use, before each (or selected) pulses from the light source with substantively no interruption to the measurement process.

Figure 2:
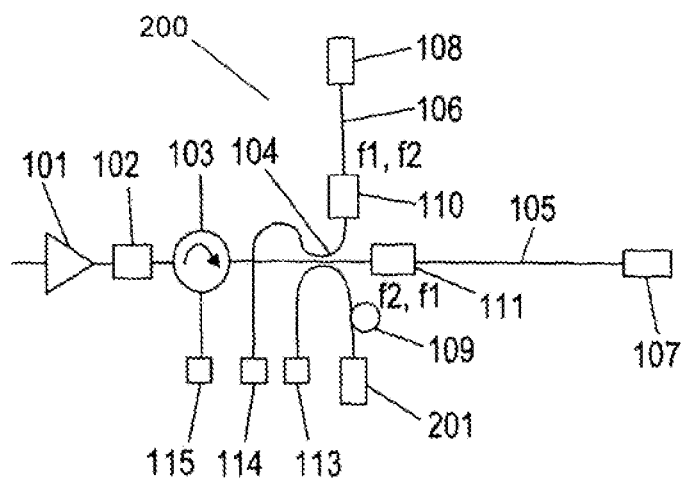

Variations to the above-described embodiments are within the scope of the invention, and some alternative embodiments are described below. FIG. 2 shows another embodiment, generally depicted at 200, of a novel interferometer similar to that shown in FIG. 1 but with an additional Faraday-rotator mirror 201 instead of photodetector 112. Like components are indicated by like reference numerals. In this case the interference between different paths, which may have different path length, can be separated at the three beat frequencies $f_1$, $f_2$ and $(f_2-f_1)$. The arrangement of this embodiment has the advantage of providing additional flexibility in operation, for example the different heterodyne frequencies can provide different modes of operation to generate measurements at different spatial resolutions.

Figure 3:
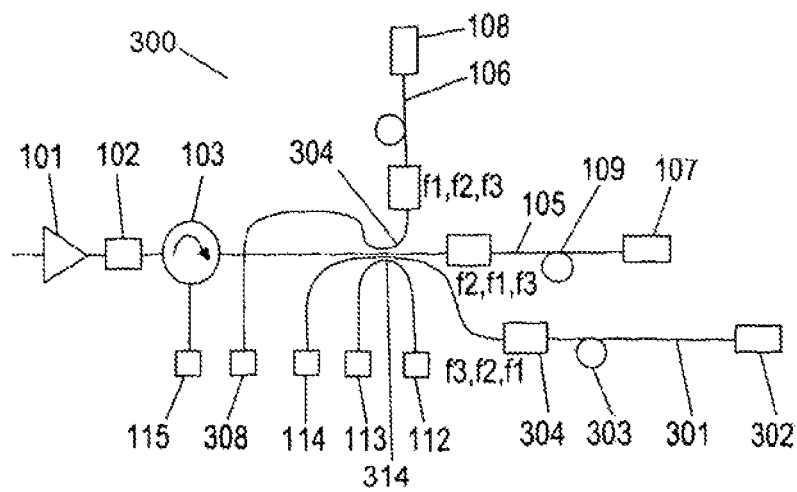

FIG. 3 shows another embodiment of a novel interferometer, generally depicted at 300, similar to the arrangement of FIG. 1, with like components indicated by like reference numerals. However, this embodiment uses a 4×4 coupler 314 and an additional optical path 301, frequency shifter 304, phase modulator 303, Faraday-rotator mirror 302 and additional photo-detector 308. In this case the interference between different paths, which may have different path length differences, can be separated at the three beat frequencies $(f_2-f_1)$, $(f_3-f_2)$ and $(f_3-f_1)$. Alternatively, the Faraday-rotator mirror 302 may be replaced by an isolator or a fibre matched end so that no light is reflected through path 301, so only allowing interference between path 105 and 106. An m×m coupler that generates m interference signal components at different relative phase shifts may also be used in other embodiments of the invention.

Figure 4:
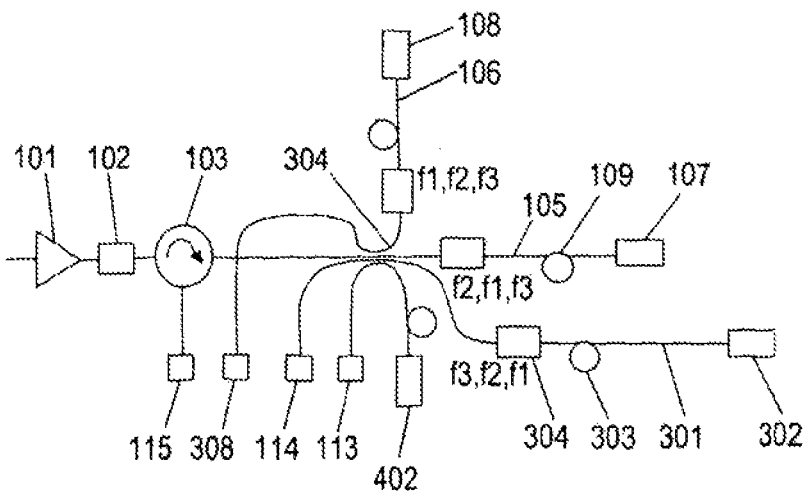

FIG. 4 shows another embodiment of the interferometer. In this case an additional path is introduced in the interferometer by inserting a Faraday-rotator mirror 402 instead of the photo-detector 112.

In all of the above-described embodiments, optical switches may be used to change and/or select different combinations of optical path lengths through the interferometer. This facilitates switching between different spatial resolution measurements (corresponding to the selected path length differences in the optical path lengths).

Figure 5:
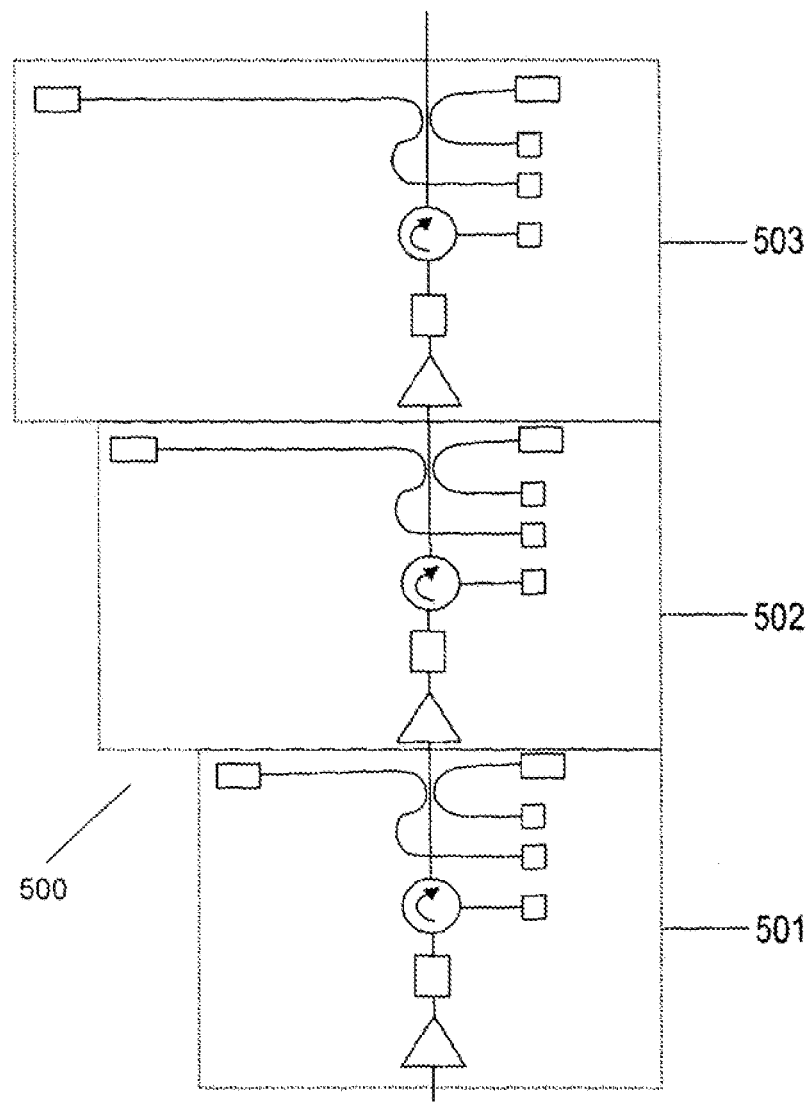
FIGS. 5 and 6 show schematically how the interferometers can be cascaded according to embodiments of the invention in series and/or star configurations.
Figure 6:
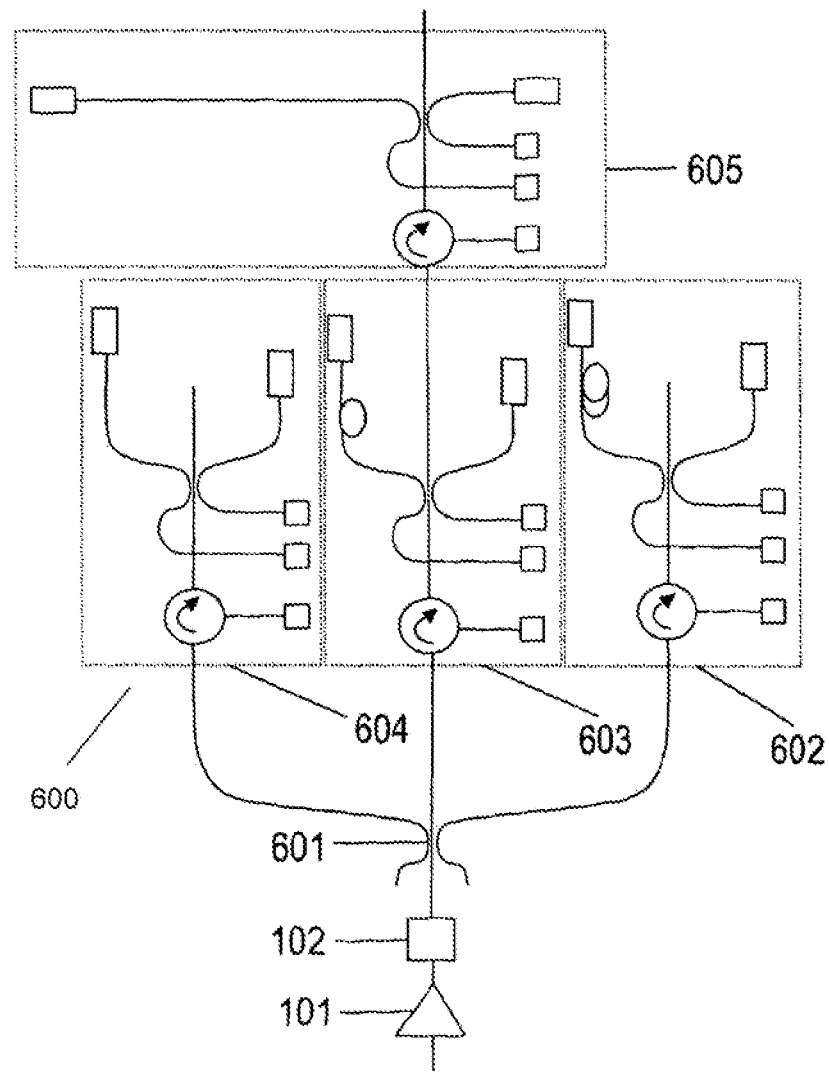

FIGS. 5 and 6 show examples of interferometer systems 500, 600 arranged for used in cascaded or star configurations to allow the measuring of the relative optical phase for different path length differences. In FIG. 5, three interferometers 501, 502, 503 having different path length differences (and therefore different spatial resolutions) are combined in series. In FIG. 6, four interferometers 602, 603, 604 and 605 having different path length differences (and therefore different spatial resolutions) are combined with interferometers 602, 603, 604 in parallel, and interferometers 603 and 605 in series. In FIG. 6, 601 is a 3×3 coupler, used to split the light between the interferometers. Arrangement 600 can also be combined with wavelength division multiplexing components to provide parallel outputs for different optical wavelengths.

Figure 11:
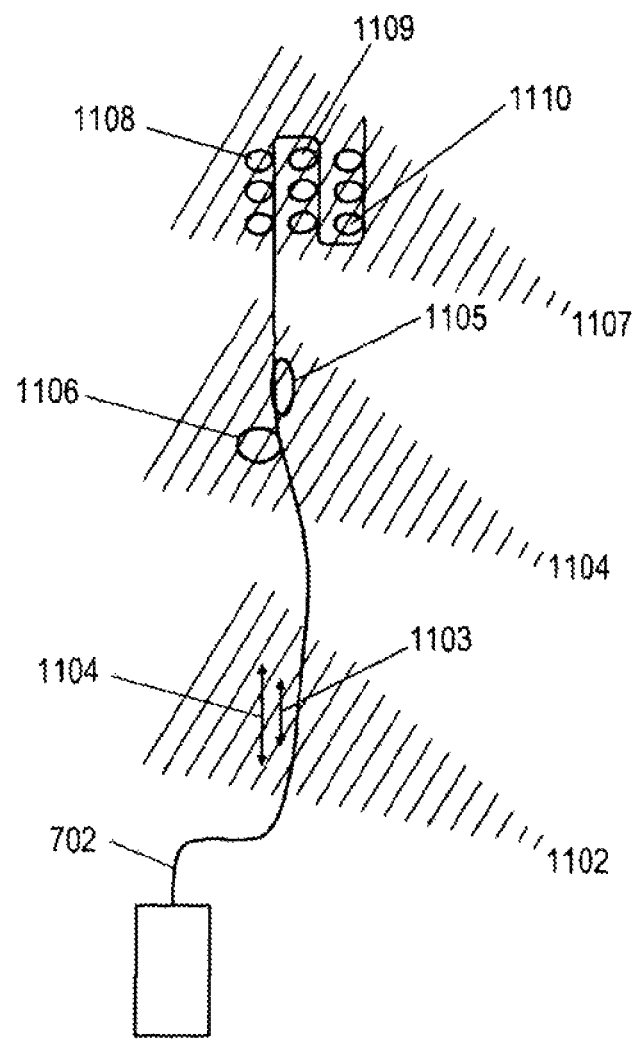
FIG. 11 shows schematically an embodiment in which the fibre can be deployed as linear sensors, directional sensors or in a multidimensional array of sensors.

FIG. 11 shows an embodiment with distributed sensors with the sensing fibre 702 subjected to different perturbation fields 1102, 1104 and 1107. The sensing fibre can be used as linear sensors 1103 and 1104, as directional sensors 1105 and 1106 or as multi-dimensional array sensors 1108, 1109 and 1110. Since all the measurements are synchronised, they can be processed to enhance the signal sensitivity, achieve a wide dynamic range and provide field imaging using beam forming techniques.

The embodiments described with reference to FIGS. 1 to 7 and 9 to 11 relate to apparatus and methods for fast quantitative measurement of acoustic perturbations of optical fields transmitted, reflected and or scattered along a length of an optical fibre. The invention in its various aspects can be applied or implemented in other ways, for example to monitor an optical signal generated by a laser, and/or to monitor the performance of a heterodyne signal generator, and to generate optical pulses for transmission into an optical signal. An example is described with reference to FIG. 8.

Figure 8:
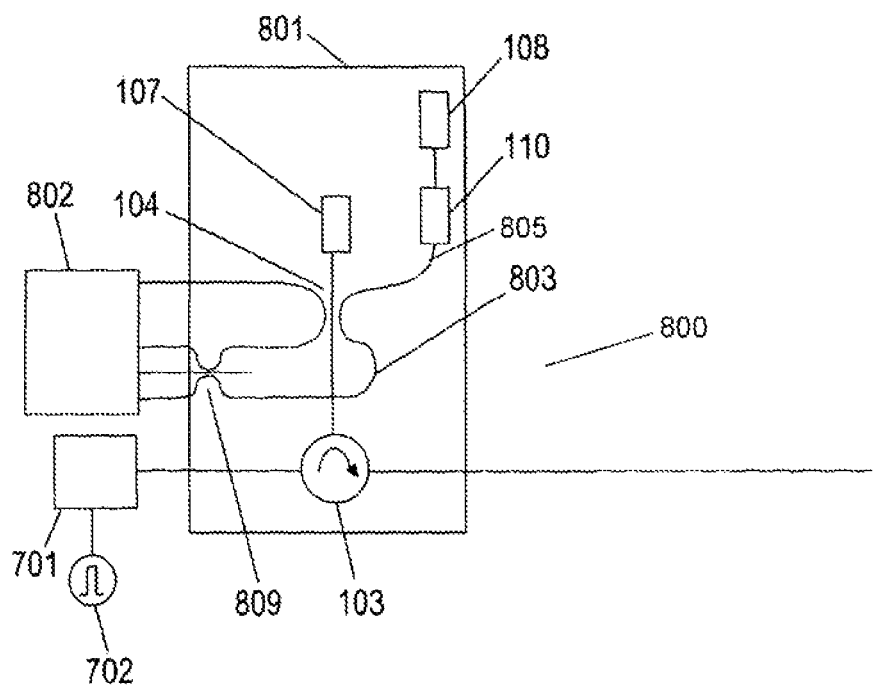
FIG. 8 shows schematically a distributed sensor system that utilises the interferometer of an embodiment of the invention to generate a series of pulses each of different frequency.

FIG. 8 shows a system, generally depicted at 800, comprising an interferometer 801 in accordance with an embodiment of the invention, used to generate two optical pulses with one frequency-shifted relative to the other. The interferometer receives an input pulse from a laser 701, via optical circulator 103. A 3×3 optical coupler 104 directs a component of the input pulse to a photodetector, and components to the arms of the interferometer. One of the arms includes a frequency shifter 110 and an RF signal 805. The interference between the two pulses is monitored by a demodulator 802. The light reflected by Faraday-rotator mirrors 107 and 108 is combined at the coupler 809 using a delay 803 to match the path length of the interferometer, so that the frequency shifted pulse and the input pulse are superimposed. The coupler 809 introduces relative phase shifts to the interference signal, and interferometer therefore monitors three heterodyne frequency signal components at relative phase shifts. The optical circulator 103 passes the two pulses into the sensing fibre.

Review of Features of the Invention in its Various Aspects and Embodiments

In one aspect, the invention provides an optical interferometer apparatus which can provide multiple path differences between the optical signals and provide interference signals between different optical paths with fixed and/or variable phase shifts. The interferometer utilises beam splitting components, circulating devices and Faraday rotator mirrors in a novel configuration. The optical signals at the output of the interferometer are converted to electrical signals which digitised for fast processing. The offset levels of the electrical signals are removed and their amplitude are normalised. The relative phase shifts of optical signals are accurately determined by combining the normalised electrical signals.

In another aspect, the invention relates to an interferometer apparatus that utilises beam splitters and non-reciprocal devices to provide light interference with given phase shifts and path length differences that can be measured at all ports of the beam splitters whereby the relative phase modulation of the light can be computed very accurately and quickly, such as at every few nanoseconds. The interferometer may use optical fibre components such as an m×m fused optical fibre coupler that is connected to an optical fibre circulator at one of its ports; Faraday-rotator mirrors that reflect and, at the same time, provide polarisation compensation for the light propagating through the different paths of the interferometer and photodetectors that are used to measure the interference light signals. The incoming optical light may be amplified using an optical fibre amplifier, and preferably the interferometer has a pass band optical filter to filter out the out of band Amplified Spontaneous Emission noise (ASE). The interferometer may provide birefringence compensation for light propagating along different optical paths through the interferometer. This provides sufficiently high visibility at the outputs of the interferometer.

In another of its aspects, the invention provides a method for compensating the offset and the gain of the photo-detectors, and the coupling ratio of the interferometer arms, to normalise the resultant interference signals used to measure the relative phase of the modulated input light in any of preceding claims where the detector offset is measured by switching off the optical amplifier in the backscatter path; the resultant photo-detector offset and gain then being determined by switching on the amplifier while the input light is switched off; the ASE of the optical amplifier then acts as an independent incoherent light source and thereby the offsets and relative gains of the photo-detectors can be determined and the detected light signals normalised. The method may therefore use incoherent light that enters the input of the interferometer to normalise the relative signal amplitudes at the output of the photo-detectors. For example, when an optical preamplifier is used at the input of the interferometer, the spontaneous light emission can be used to measure the combination of the splitting ratio of the interferometer arms and the relative gains of the photo-detectors and thereby normalise the relative signal amplitudes accordingly.

Another additional feature of the present invention is to use phase modulators and/or frequency shifters to shift the relative frequency and or vary the phase between the optical paths of the interferometer. Frequency shifters and/or phase modulators may be used to provide heterodyne signals and/or to separate the resultant interference light signal from different paths through the interferometer.

An additional feature of an embodiment of the invention is selecting the frequency of the frequency shifter sufficiently high so that at least one cycle of the beat frequency results within one light pulse resolution. Different frequency shifts may be used between different optical paths of the interferometer for the separation and/or heterodyne detection of the phase between different optical paths. The frequency shifts between different optical paths may be alternated to correct for any frequency dependency of the interferometer output signals.

An additional feature of an embodiment of the invention is the selection of different optical paths through the interferometer such as by using optical switches. The optical switches may be used to select different optical paths through the interferometer and thereby select a different spatial resolution measurement. Another aspect of the invention relates to a system comprising a number of interferometers cascaded in a series or in a star configuration or a combination of both.

The invention also provides a system that utilises a light pulse for multiplexed and/or distributed sensors by measuring the phase modulation of the reflected and/or the backscattered light along a length of fibre with high sensitivity, high dynamic range and a high speed of over tens of kilohertz. In this way, the invention can provide a multiplexed and/or distributed acoustic sensing system.

An additional feature of an embodiment of the invention is digitising the outputs of the interferometer, or the photodetectors of the interferometer, at least twice over a spatial resolution interval. An additional feature of an embodiment of the invention is combining the outputs of the interferometer to determine the insensitive measurement sample points resulting from any signal fading of the light in order to reject and/or provide a weighted signal average of the multiple samples of the light over a given spatial resolution measurement or interval. Embodiments of the invention use a digitiser with dynamically varying clock cycles, (which may be referred to herein as "iclock"), to adjust the timing of the digital sampling of the light for the maximum signal sensitivity positions. The dynamically varying clock may be used to adjust the timing of the digitised samples at the photodetector outputs for the position of maximum signal sensitivity and or shifted away where light signal fading occurs.

Embodiments of the invention may use a laser light or a broadband light source. Coherent matching of the light with the same delay results in an interference signal that can be used to measure the relative phase modulation of the scattered or reflected light along the fibre. The invention may use wavelength division multiplexed components to utilise multiple laser light pulses with different wavelengths and, preferably, varying time shift with respect to each to control the cross-phase modulation between the light pulses and to allow the processing of multiple pulses in the sensing fibre without and cross-sensitivity to allow the system to achieve a higher measurand frequency response. This may be the acoustic frequency response of the system to provide a different spatial sampling resolutions and/or positions, and/or to allow the efficient rejection of any points with low sensitivity.

An additional feature of an embodiment of the invention is the selection of different spatial resolutions whereby the sensitivity and the frequency response along the sensing fibre can be adjusted, and the dynamic range can be widened.

The sensing fibre may be single mode fibre, polarisation maintaining fibre, a single polarisation fibre, multimode fibre, and/or a ribbon fibre, and it may be coated and/or cabled to enhance or to suppress its sensitivity.

An additional feature of an embodiment of the invention is the selection of different configurations of the fibre to optimise the sensitivity, the frequency and the directionality of the sensing fibre at different locations. The fibre may be deployed as linear sensors, direction sensors or multidimensional array sensors. The fibre may be placed on a surface area in a continuous path without crossing over another part of the fibre to increase the sensitivity.

The fibre may be attached on a surface of a vessel to listen to the noise generated within the vessel to monitor the changes in the process, acoustically image the process, as well to detect any leaks.

A further aspect provides an apparatus using acoustic sensors for distributed flow measurement and imaging, in-well perforated zones monitoring and sand production monitoring. For example, for in-well applications, the acoustic noise profile can be used to measure the flow by noise logging at every location along the well. In addition, the noise spectrum can be used to identify the phase of the fluid. Further noise spectrum correlation techniques can be used over a long section of the well to determine the speed of sound as well as tracking eddies generated within the flow to accurately determine the flow rates.

The sensor systems may be used as a distributed acoustic sensor, enabling the determination of distributed flow measurement and imaging, perforated zones monitoring and sand production monitoring in oil and gas wells and flowlines. The distributed temperature and strain measurements may be combined to enhance the data interpretation of the distributed acoustic sensor.

Another aspect provides pipeline monitoring apparatus where the sensing fibre is deployed inside the pipeline and carried along the pipeline by the fluid drag to provide a measurement of the noise flow for diagnostics of the pipeline as well as for flow characterisation and/or imaging.

Other advantages and applications of the invention will be apparent to those skilled in the art. Any of the additional or optional features can be combined together and combined with any of the aspects, as would be apparent to those skilled in the art.

Concluding Remarks

As has been described above, apparatus and methods for fast quantitative measurement of perturbations of optical fields transmitted, reflected and/or scattered along a length of an optical fibre. In particular, the invention can be used for distributed sensing while extending dramatically the speed and sensitivity to allow the detection of acoustic perturbations anywhere along a length of an optical fibre while achieving fine spatial resolution. The present invention offers unique advantages in a broad range of acoustic sensing and imaging applications. Typical uses are for monitoring oil and gas wells such as for distributed flow metering and/or imaging, monitoring long cables and pipelines, imaging of large vessels as well as security applications.

REFERENCES

[1] U.S. Pat. No. 6,555,807, Clayton et al.
[2] WO 98/27406, Farhadiroushan et al.
[3] U.S. Pat. No. 7,355,163, Watley et al.
[4] U.S. Pat. No. 5,194,847, Taylor et al.

[5] Shatalin, Sergey et al., "Interferometric optical time-domain reflectometry for distributed optical-fiber sensing", Applied Optics, Vol. 37, No. 24, pp. 5600-5604, August 1998.
[6] WO 2008/056143, Shatalin et al.
[7] WO 2004/102840, Russel et al.
[8] GB 2445364, Strong et al.
[9] US 2009/0114386, Hartog et al.
[10] WO 2009/056855, Hartog et al.
[11] WO 2007/049004, Hill et al.
[12] Zhigiang Zhao et al., "Improved Demodulation Scheme for Fiber Optic Interferometers Using an Asymmetric 3×3 Coupler", J. Lightwave Technology, Vol. 13, No. 11, November 1997, pp. 2059-2068
[13] U.S. Pat. No. 5,946,429, Huang et al

The invention claimed is:

1. An interferometer apparatus for an optical fibre system, the apparatus comprising:
an optical coupler having an input port and first and second ports coupled to optical fibres which define first and second optical paths;
first and second Faraday rotator mirrors arranged respectively at the ends of the first and second optical paths to reflect light propagating in the first and second optical paths back to the optical coupler to generate an interference signal;
wherein the optical coupler is configured to direct first and second interference signal components of the interference signal respectively to first and second detector ports, and is configured to direct a third interference signal component of the interference signal towards the input port, and the apparatus comprises means for introducing a phase shift between the first, second and third interference signal components;
first and second photodetectors connected to first and second detector ports of the optical coupler and configured to measure an intensity of the first and second interference signal components at respective phase shifts;
a third photodetector connected to a non-reciprocal optical device and configured to measure the intensity of the third interference signal component directed back towards the input port;
an incoherent light source configured to propagate light in the interferometer apparatus; and
calibration circuitry configured to:
determine an electrical offset for each of the photodetectors from the outputs of the photodetectors in a first condition, in which no light is input to the input port and the incoherent light source is switched off so that no light propagates in the interferometer apparatus; and
determine at least one of a photodetector offset, a relative photodetector gain, and a coupling ratio of the first and second optical paths from the outputs of the photodetectors in a second condition, in which the incoherent light source is switched on such that light propagates in the interferometer apparatus.

2. The interferometer apparatus as claimed in claim 1, wherein the means for introducing a phase shill between the first, second and third interference signal components is the optical coupler.

3. The interferometer apparatus as claimed in claim 1, wherein the optical coupler is m×m optical coupler, where m≥3.

4. The interferometer apparatus as claimed in claim 1, wherein the non-reciprocal optical device is an optical circulator.

5. The interferometer apparatus as claimed in claim 1, wherein a third output port of the optical coupler is connected to a fourth photodetector.

6. The interferometer apparatus as claimed in claim 1, wherein a third output port of the optical coupler is coupled to an optical fibre defining a third optical path, and the apparatus comprises a third reflector arranged in the third optical path to reflect light propagating in the third optical path back to the optical coupler to generate an interference signal.

7. The apparatus of claim 1, further comprising a bandpass filter arranged to filter the light from the incoherent light source, such that the light propagating in the interferometer apparatus has a bandwidth around the frequency of the light propagating in the first and second optical paths.

8. The apparatus as claimed in claim 1, wherein the light input to the interferometer apparatus has a coherence length shorter than the length of the first and second optical paths of the interferometer apparatus such that substantially no interference signal is detected.

9. The apparatus as claimed in claim 1, further comprising:
an optical amplifier configured to receive transmitted, reflected or backscattered light propagating in the first and second optical paths and output an amplified light signal;
wherein an Amplified Spontaneous Emission (ASE) of the optical amplifier is the incoherent light source.

10. The apparatus as claimed in claim 9, wherein the calibration circuitry operates at least whilst the interferometer apparatus is in a third condition, in which the optical amplifier receives an input light signal from the light some and outputs an amplified light signal.

11. The apparatus as claimed in claim 10, wherein the calibration circuitry operates between optical signal pulses.

12. An Interferometer system comprising a first interferometer apparatus as claimed in claim 1, and a second interferometer apparatus as claimed in claim 1, wherein a third output port of the optical coupler of the first interferometer apparatus is coupled to an input of the second interferometer apparatus.

13. The interferometer system as claimed in claim 12 comprising multiple interferometer apparatuses, wherein respective output ports of a subset of the interferometer apparatuses are utilised as inputs for sequential interferometer apparatuses.

14. The interferometer system as claimed in claim 13 wherein the interferometer apparatuses are cascaded in series and/or in a star configuration.

15. The interferometer system as claimed in claim 14 wherein different interferometer apparatuses have different optical path length differences.

16. An optical fibre system for monitoring an optical signal, the system comprising:
a light source;
an optical fibre deployed in an environment to be monitored and coupled to the light source;
an interferometer apparatus as claimed in claim 1 and configured to receive backscattered or reflected light from the optical fibre;
data capturing means for gathering data output from the photodetectors of the interferometer apparatus.

17. The optical fibre system as claimed in claim 16, further comprising data processing apparatus for processing the data output from the photodetectors to derive an acoustic signal.

18. The optical fibre system as claimed in claim 16, wherein the environment to be monitored is subterranean, a wellbore, or comprises a pipeline.

19. The optical fibre system as claimed in claim 16, wherein the optical fibre is deployed linearly.

20. The optical fibre system as claimed in claim 16, wherein the optical fibre is deployed at least partially in a planar arrangement to provide directional sensing.

21. The optical fibre system as claimed in claim 16, wherein the optical fibre is deployed in a multidimensional array.

22. The optical fibre system as claimed in claim 16, wherein at least a part of the optical fibre is arranged on a surface area in a continuous path without crossing over another part of the fibre.

23. A method of monitoring acoustic perturbations, the method comprising:
providing a light source, an optical fibre deployed in an environment to be monitored and coupled to the light source, and an interferometer configured to receive a pulsed optical signal from the optical fibre, the interferometer comprising at least two optical paths having Faraday rotator mirrors at the ends thereof and at least three photodetectors;
receiving, in the interferometer, backscattered light from the optical fibre, and generating an interference signal in dependence thereon;
introducing a phase shift between first, second, and third interference signal components of the interference signal, and directing the first, second, and third interference signal components to first, second, and third photodetectors respectively;
measuring the intensity of the first, second, and third interference signal components at respective phase shills to provide first intensity data, second intensity data, and third intensity data;
processing the first, second, and third intensity data to determine an optical phase angle of the optical signal to thereby provide optical phase angle data and optical phase angle modulation data and;
identifying acoustic perturbations to which the optical fibre has been exposed from the optical phase angle modulation data;
determining a normalisation factor for at least one of a photodetector offset, a relative photodetector gain, and a coupling ratio of the interferometer optical paths, by inputting light from an incoherent light source to the interferometer and measuring the outputs of the photodetectors;
wherein the determining further comprises:
determining the electrical photodetector offset for each of the photodetectors from the outputs of the photodetectors in a first condition, in which transmitted, reflected or backscattered light propagating through the optical fibre is decoupled from the interferometer and the incoherent light source is switched off so that no light is input to the interferometer; and
determining at least one of the photodetector offset, the relative photodetector gain, and the coupling ratio of the interferometer optical paths from the outputs of the photodetectors in a second condition, in which transmitted, reflected or backscattered light propagating through the optical fibre is decoupled from the interferometer and the incoherent light source is switched on to input light to the interferometer.

24. The method as claimed in claim 23, comprising selecting a spatial resolution interval at which optical phase angle data is desired, and oversampling the outputs of the photodetectors to provide multiple optical phase angle data over the spatial resolution interval.

25. The method as claimed in claim 23, comprising:
providing an optical amplifier configured to receive transmitted, reflected or backscattered light propagating through the fibre and output an amplified light signal to the interferometer; and
utilising the Amplified Spontaneous Emission of the optical amplifier (ASE) as the incoherent light source.

26. The method as claimed in claim 23 comprising:
operating the interferometer in a third condition, in which the optical amplifier receives an input light signal from the light source and outputs an amplified light signal to the interferometer; and
correcting for offsets and normalising the signals detected at the photodetectors using the determined normalisation factor.

27. The method as claimed in claim 23, further comprising;
filtering the light from the incoherent light source using a bandpass titter, such that the light input to the interferometer has a bandwidth around the frequency of light transmitted, reflected or backscattered light propagating through the fibre.

28. The method as claimed in claim 23, wherein the light input to the interferometer has a coherence length shorter than the length of the interferometer optical paths such that substantially no interference signal is detected.

29. The method as claimed, in claim 26, further comprising:
correcting for offsets and normalising the signals detected at the photodetectors between optical signal pulses.

* * * * *